3,299,060
METHOD FOR PRODUCING STABLE SALTS OF DICHLOROISOCYANURIC ACID (II)
Stephen J. Kovalsky, Scotch Plains, and Raymond A. Olson, Westfield, N.J., assignors to FMC Corporation, New York, N.Y., a corporation of Delaware
No Drawing. Filed June 17, 1964, Ser. No. 375,935
4 Claims. (Cl. 260—248)

This invention relates to an improvement in the production of salts of dichloroisocyanuric acid and more particularly to the large scale production of salts of dichloroisocyanuric acid which have the same high degree of stability against decomposition which is obtainable by ordinary small scale operations.

In this application, the term "salts of dichloroisocyanuric acid" is intended to cover all salts of dichloroisocyanuric acid regardless of the tautomeric form in which they may exist.

Salts of dichloroisocyanuric acid have become widely accepted as a source of available chlorine for use in solid bleaching and detergent compositions. The most popular of these compounds are sodium dichloroisocyanurate and potassium dichloroisocyanurate. These latter compounds have been found especially desirable in solid detergent or bleaching compositions because they are relatively stable under ambient conditions, in the absence of substantial amounts of moisture, and are capable of giving off their active chlorine when placed in aqueous solutions intended for bleaching, disinfecting or germicidal action.

One method for preparing these salts, which is commonly practiced by manufacturers, is carried out by simply reacting dichloroisocyanuric acid and either potassium or sodium hydroxide in an aqueous medium. The reaction is carried out at temperatures of from about 5° C. to about 65° C. and the reaction mixture is maintained at a pH of from about 6 to about 7. The reactants normally are in about stoichiometric proportions within this pH range and are in the form of an aqueous slurry containing up to about 50% solids. After termination of the reaction the resultant slurry is treated in separatory equipment to remove the solids from the mother liquid (i.e. the filter or centrifuge effluent). The solids which are composed of dichloroisocyanuric acid salt crystals are dried to remove both uncombined and combined water, to a substantially anhydrous product. It is preferred to maintain the water content of the resultant product, either as combined or uncombined water, as low as possible (e.g. 0.2% by wt. $H_2O$) since storage stability of the final product decreases rapidly in the presence of moisture. In addition, formulators prefer to use the anhydrous form of these dichloroisocyanuric acid salt products for ease of handling and for incorporation in bleaching and sanitizing formulations.

A serious difficulty which has arisen in the manufacture of these dichloroisocyanuric acid salt products in large scale production is the wide range of thermal stability of the products during drying. Thermal stability of the instant products is important because they normally are dried in a gas stream maintained at elevated temperatures to remove all but negligible amounts of moisture without reducing their active chlorine contents. If the products do not have good thermal stability a sizable portion may be lost by decomposition during drying and can result in a plant shut-down to remove the decomposed salts and to prevent additional quantities of product from decomposing during the drying operation. For example, a thermally unstable cake of potassium dichloroisocyanurate will decompose when drying of this product is attempted by heating the salt to temperatures somewhat above 95° C. A thermally stable potassium dichloroisocyanurate, by contrast, can be heated to temperatures as high as 140° C. without material decomposition.

An added factor which aggravates this situation is that one batch of dichloroisocyanuric acid salt product will vary in its thermal stability from another batch even though both are produced under almost identical conditions. The variation in the thermal stability of different batches of the final product necessitates changing the plant procedure required for drying the product. This presents serious production problems particularly in continuous processing which requires a product having a consistently high thermal stability so that an established plant drying procedure can be maintained throughout the production cycle.

With respect to the variation in thermal stability of the dichloroisocyanuric acid salt products produced by the above procedure, it has been noted that the initial product which is obtained at the start-up of plant runs has been found to have good thermal stability—essentially like that obtained in laboratory operations. However, after the plant has been in operation intermittently the thermal stability of the resultant product commences to decrease and finally reaches a low.

Heretofore, it has not been determined what affected the thermal stability of the dichloroisocyanuric acid salt product because the reaction variables, i.e. the temperature, duration of reaction, pH values, purity of reagents, etc., all were maintained exactly the same. However, in our co-pending application, Ser. No. 375,934, filed on June 17, 1964, in the name of the present inventors, it was found that chlorine treatment of the reaction slurry aids in obtaining a high thermal stability for the salt product. The present invention is an improvement in the technique for obtaining thermally stable dichloroisocyanuric acid salt products without employing added chemicals in the reaction medium.

It is an object of the present invention to produce dry salts of dichloroisocyanuric acid which have a relatively high thermal stability and which can be dried to very low moisture contents without thermal decomposition.

These and other objects will become apparent from the following disclosure.

We have now found that the poor thermal stability of dichloroisocyanuric acid salts is due to the presence of insoluble impurities in the mother liquor which is used in making up the reaction slurry; the mother liquor normally is an effluent stream recovered from a previous reaction slurry.

We have further found that dichloroisocyanuric acid salts having a uniformly high thermal stability can be produced by polish-filtering the recycled mother liquor to remove all insoluble impurities larger than 15 microns prior to using the mother liquor as an aqueous reaction medium in the make-up of additional slurries of dichloroisocyanuric acid and an alkali metal hydroxide.

In the above reaction, the recycled mother liquor is polish-filtered to remove all insolubles larger than 15 microns. A paper filter equivalent to a Whatman No. 42 was found effective in removing such particles. These insolubles are believed to be decomposition products of dichloroisocyanuric acid which interfere with the stability of the resultant product salt. After polish-filtering the recycled mother liquor it is used as the reaction medium in forming the salts of dichloroisocyanuric acid. In this reaction, the pH of the reaction mixture should not be allowed to rise above about 7 because of the possible formation of nitrogen trichloride, which is undesirable since it is detonable, even in small quantities. The pH of the reaction slurry should also not be permitted to fall below 6.0 in order to ensure complete conversion of the dichloroisocyanuric acid to the desired product. At lowered pH values, the final product is often contaminated by unreacted agents such as dichloroisocyanuric acid. Within the pH range from about 6 to about 7, desirably high yields of pure salts of dichloroisocyanuric acid are obtained with a minimum of undesired side products.

After completion of the above reaction, a slurry is removed from the reactor, cooled to about 20° C., and treated to separate the salts of dichloroisocyanuric acid from the mother liquor. The mother liquor is recycled back to the reactor along with make-up dichloroisocyanuric acid and additional potassium or sodium hydroxide, while the separated salts of dichloroisocyanuric acid are passed to a dryer. There they are contacted with a heated gas stream to remove residual water, either in combined or uncombined form, so that the final salts of dichloroisocyanuric acid contain less than about 0.2% by weight of water.

The present process can be carried out in either a continuous process or a batch operation. In a continuous process, the dichloroisocyanuric acid and the alkaline hydroxide can be continuously added to the reactor containing the mother liquor which is used as the reaction medium. This mother liquor is first polish-filtered to remove all insolubles before it is added to the reactor for use as the reaction medium. A portion of the reactant slurry in the reactor is then constantly removed, cooled, and treated to separate the crystal salt product from its mother liquor. The mother liquor which contains sizable amounts of dissolved salt product is first polish-filtered to remove insolubles and then recycled back to the reactor for use as the reaction medium. The separated solids are rapidly dried using a heated gas stream and then packaged for shipment.

In general, the mother liquor is not discarded in either continuous or batch operations because it contains sizable quantities of salts of dichloroisocyanuric acid which must be recovered for economic operation. The dissolved salt is not lost as long as the mother liquor is constantly recycled in the system.

The above procedure can also be carried out in batch form within the required pH range by reacting batches of dichloroisocyanuric acid and an alkali metal hydroxide together until the reaction has gone to completion and then cooling and filtering the resultant slurry to separate the product salt crystals from the mother liquor. Thereafter, the mother liquor is polish-filtered to remove insolubles and can be used as a heel or reaction medium for carrying out subsequent reactions between dichloroisocyanuric acid and an alkali hydroxide.

In order to provide a rapid and standard method of determining the thermal stability of the resultant potassium or sodium dichloroisocyanurates, the following test was devised. In this test, a 5–10 g. sample of the dried product is placed in a test tube and the tube inserted into a molten salt bath which is at a temperature of 275° C. The time required for the sample to commence decomposing in the test tube is a measure of its stability and is termed its "stability time." In the case of potassium dichloroisocyanurate, a thermally stable product begins decomposing in about 120 sec. or more while an unstable product will begin decomposing in from only 30–50 sec. In the case of sodium dichloroisocyanurate, a thermally stable product will not begin decomposing in the salt bath until the passage of at least about 150 sec., while an unstable product begins decomposing in under 100 sec.

When the reaction is carried out using a fresh aqueous reaction medium in the reactor instead of recycled mother liquor, the resulting salt product has good thermal stability even without a filtration treatment. This is essentially what occurs in a plant start-up procedure and the good thermal stability of the product is believed due to the comparative lack of solid impurities in the aqueous mixture used in the reactor.

It is not known how the impurities present in the mother liquor hinder the formation of stable salts of dichloroisocyanuric acid. It has been observed, however, that stable potassium dichloroisocyanuric acid crystals are characterized by having a large cross sectional area of about 1500 square microns and a definite rhomboidal structure. By contrast, the thermally unstable potassium dichloroisocyanurate have been found to have very fine nondescript crystals having cross sectional areas of only 25 to about 50 square microns. In the case of the sodium dichloroisocyanurate, the thermally stable salts have a coarse rod-like crystal structure compared with the fine needle-like crystals of thermally unstable product. Further, the thermally stable salts of sodium dichloroisocyanurate can be readily filtered and separated from the mother liquor by virtue of the larger crystal size than the thermally unstable, fine needle-like sodium dichloroisocyanurate crystals.

The following examples are given to illustrate the present invention and are not deemed to be limiting thereof.

Example I

*Run A.*—A continuous preparation of potassium dichloroisocyanurate was carried out by feeding a 20% by weight dichloroisocyanuric acid aqueous slurry into a reactor. Simultaneously, a 50% potassium hydroxide solution was fed to the reactor at a rate sufficient to maintain the pH at 6.8. The temperature of the reaction mixture was controlled between 20 and 25° C. by cooling the reaction mixture in a water cooled heat exchanger. The aqueous liquor used in the make-up of the dichloroisocyanuric acid slurry was mother liquor from a prior batch centrifuging operation in the production of potassium dichloroisocyanurate, which had been stored for over 72 hrs. at 35° C. The resultant potassium dichloroisocyanurate salt precipitate was continually removed as a slurry and centrifuged to separate the salt from its mother liquor. The mother liquor was returned directly to the reactor as make-up reaction medium without any intermediate treatment. The wet salt product was dried by contact with heated air to less than 0.2% water. The resultant dried salt product was found to be composed of fine crystals having a cross sectional area of below 50 square microns. The resultant dry potassium dichloroisocyanurate crystals were tested for thermal stability by placing a 5–10 g. sample of the dry salt in a test tube and inserting the tube into a molten salt bath at a temperature of 275° C. The time required for initiating decomposition was recorded as the stability time of the product. The resultant crystals were found to have a stability time of only 30 sec. when tested as set forth above.

*Run B.*—The process set forth in Run A was repeated except that the recycled mother liquor was filtered through a fine filter paper equivalent to a Whatman No. 42 and the resultant clear liquor was used to prepare a new batch of potassium dichloroisocyanurate. The conditions of reaction were identical with those carried out in Run A. The resultant potassium dichloroisocyanurate crystals were separated from the mother liquor and were found to be in the form of large rhomboid crystals having a cross sectional area of about 1500 square microns. This potassium salt product had a stability time of 150 sec. when tested as set forth in Run A.

Example II

*Run A.*—The process of Example I was repeated except that stoichiometric amounts of 50% sodium hydroxide solution was used in place of the potassium hydroxide employed in Example I. After continued operation the sodium dichloroiscyanurate product was found to be composed of fine needle-like structures whose crystals filtered very poorly and which decomposed during the normal drying operation. These salts, when tested in the molten salt bath, had a stability time of 80 sec.

*Run B.*—The process set forth in Run A was repeated except that the recycled mother liquor was filtered through a fine filter paper equivalent to a Whatman No. 42 and the resultant clear liquor was used to prepare a new batch of sodium dichloroisocyanurate. The conditions of reaction were identical with those carried out in Run A. The resultant sodium dichloroisocyanurate crystals had a coarse rod-like structure and filtered easily from the mother liquor. This product dried readily without thermal decomposition and when tested in the molten salt bath had a stability time of 165 sec.

Pursuant to the requirements of the patent statutes, the principle of this invention has been explained and exemplified in a manner so that it can be readily practiced by those skilled in the art, such exemplificatoin including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of producing a salt of dichloroisocyanuric acid selected from the group consisting of sodium dichloroisocyanurate and potassium dichloroisocyanurate wherein dichloroisocyanuric acid and an alkali metal hydroxide selected from the group consisting of sodium hydroxide and potassium hydroxide are reacted together as a slurry in an aqueous reaction medium maintained at a pH of from about 6 to about 7 and at a temperature of from about 5 to about 65° C. to produce a dichloroisocyanuric acid salt product, said reaction mixture is separated into a substantially solid product stream and a substantially liquid effluent stream, said liquid effluent stream is recycled for use as an aqueous reaction medium in the make-up of additional slurries of said dichloroisocyanuric acid and an alkali metal hydroxide, said solid product stream is dried to obtain said dichloroisocyanuric acid salt product in a substantially anhydrous state, the improvement which comprises filtering the liquid effluent stream to remove suspended particles larger than 15 microns before said stream is utilized as an aqueous reaction medium in the make-up of additional slurries of dichloroisocyanuric acid and an alkali metal hydroxide, whereby said aqueous reaction medium is freed of impurities which affect the thermal stability of the dichloroisocyanuric acid salt crystals produced therein, and recovering from said reaction mixture a dichloroisocyanuric acid salt product having a high thermal stability.

2. Process of claim 1 wherein said salt is potassium dichloroisocyanurate and said alkali metal hydroxide is potassium hydroxide.

3. Process of claim 1 wherein said salt is sodium dichloroisocyanurate and said alkali metal hydroxide is sodium hydroxide.

4. Process of claim 1 wherein the temperature of the reaction is from about 20–30° C.

References Cited by the Examiner
UNITED STATES PATENTS

| | | | |
|---|---|---|---|
| 2,913,460 | 11/1960 | Brown et al. | 260—240 |
| 3,035,054 | 5/1962 | Symes et al. | 260—248 |
| 3,035,057 | 5/1962 | Symes et al. | 260—248 |

WALTER A. MODANCE, *Primary Examiner.*

JOHN M. FORD, *Assistant Examiner.*